(12) United States Patent
Moreau (10) Patent No.: US 8,078,668 B2
(45) Date of Patent: Dec. 13, 2011

(54) METHOD AND DEVICE FOR PROCESSING A MESSAGE IN A COMMUNICATION NETWORK

(75) Inventor: Jean-Jacques Moreau, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 1297 days.

(21) Appl. No.: 10/132,511

(22) Filed: Apr. 26, 2002

(65) Prior Publication Data

US 2002/0184386 A1    Dec. 5, 2002

(30) Foreign Application Priority Data

Apr. 27, 2001    (FR) .................................... 01 05722

(51) Int. Cl.
*G06F 15/16*    (2006.01)
(52) U.S. Cl. .................... 709/203; 709/245; 709/246
(58) Field of Classification Search .................. 719/313; 370/400, 432; 709/245, 246, 203, 238; 715/733
See application file for complete search history.

(56) References Cited

U.S. PATENT DOCUMENTS

| | | | |
|---|---|---|---|
| 4,794,594 A * | 12/1988 | Picard | 370/392 |
| 5,383,187 A * | 1/1995 | Vardakas et al. | 370/312 |
| 5,515,513 A * | 5/1996 | Metzger et al. | 709/249 |
| 5,579,480 A * | 11/1996 | Cidon et al. | 709/243 |
| 5,712,712 A * | 1/1998 | Sayward | 358/403 |
| 5,736,933 A * | 4/1998 | Segal | 340/7.22 |
| 5,745,494 A * | 4/1998 | Tatsuta et al. | 370/452 |
| 5,845,086 A * | 12/1998 | Doebrich et al. | 709/238 |
| 5,920,267 A * | 7/1999 | Tattersall et al. | 370/258 |
| 5,944,843 A | 8/1999 | Sharma et al. | 714/701 |
| 6,125,399 A * | 9/2000 | Hamilton | 709/245 |
| 6,401,132 B1 * | 6/2002 | Bellwood et al. | 709/246 |
| 6,415,332 B1 * | 7/2002 | Tuel, Jr. | 719/313 |
| 6,532,494 B1 * | 3/2003 | Frank et al. | 709/224 |
| 6,581,175 B1 * | 6/2003 | Crump et al. | 714/748 |
| 6,633,570 B1 * | 10/2003 | Lovell et al. | 370/400 |
| 6,636,855 B2 * | 10/2003 | Holloway et al. | 1/1 |
| 6,782,415 B1 * | 8/2004 | Quine | 709/206 |
| 6,865,182 B2 * | 3/2005 | Ochiai et al. | 370/390 |
| 6,944,165 B2 * | 9/2005 | Fujiyama et al. | 370/400 |
| 7,206,311 B2 * | 4/2007 | Lovell et al. | 370/390 |
| 7,539,154 B1 * | 5/2009 | MacKay et al. | 370/256 |
| 2002/0010746 A1 * | 1/2002 | Jilk et al. | 709/206 |

(Continued)

FOREIGN PATENT DOCUMENTS

WO    WO 01/30098 A1    4/2001

*Primary Examiner* — Douglas Blair
*Assistant Examiner* — Benjamin Ailes
(74) *Attorney, Agent, or Firm* — Fitzpatrick, Cella, Harper & Scinto (57) ABSTRACT

A method of processing a message in a communication network in which the message travels along a path which may be closed and which comprises a plurality of nodes. The message is constituted by a plurality of distinct information blocks of which certain may be destined for different nodes. The method is implemented in a node of the path and comprises the following steps: receiving the message; identifying in the message the information blocks destined for the node; processing the identified information blocks, with the creation as a consequence of at least one result data item; modifying the message by inclusion in it of the resulting item or items of data; and transmitting the message to the following node along the path. The invention also relates to a device adapted to implement the method.

24 Claims, 5 Drawing Sheets

U.S. PATENT DOCUMENTS

2002/0156841 A1* 10/2002 Landfeldt et al. ............. 709/203
2002/0184386 A1* 12/2002 Moreau ......................... 709/238
2002/0198999 A1* 12/2002 Smith et al. ................... 709/227
2003/0050985 A1* 3/2003 Shinohara ..................... 709/206
2003/0061387 A1* 3/2003 Brown et al. ................. 709/246
2003/0217176 A1* 11/2003 Beunings ...................... 709/238

* cited by examiner

METHOD AND DEVICE FOR PROCESSING A MESSAGE IN A COMMUNICATION NETWORK

The present invention relates generally to computer communication networks, and in particular to the transmission of messages in these networks.

More particularly, the invention concerns a method of processing a message in a communication network, the message traveling on the network along a path comprising a plurality of nodes, and being constituted by a plurality of distinct information blocks of which certain may be destined for different nodes. The path considered can be, for example, a closed path, that is to say forming a loop beginning and ending with the node transmitting the message, or else a path extending between the transmitter node transmitting the message and a receiver node.

The invention also concerns a device comprising means adapted to implement the above method.

In the field of computer communication networks, certain communication protocols, such as HTTP (Hypertext Transfer Protocol) or XMLP (eXtensible Markup Language Protocol, make it possible to send a message via one or several intermediary nodes.

Figure 1:
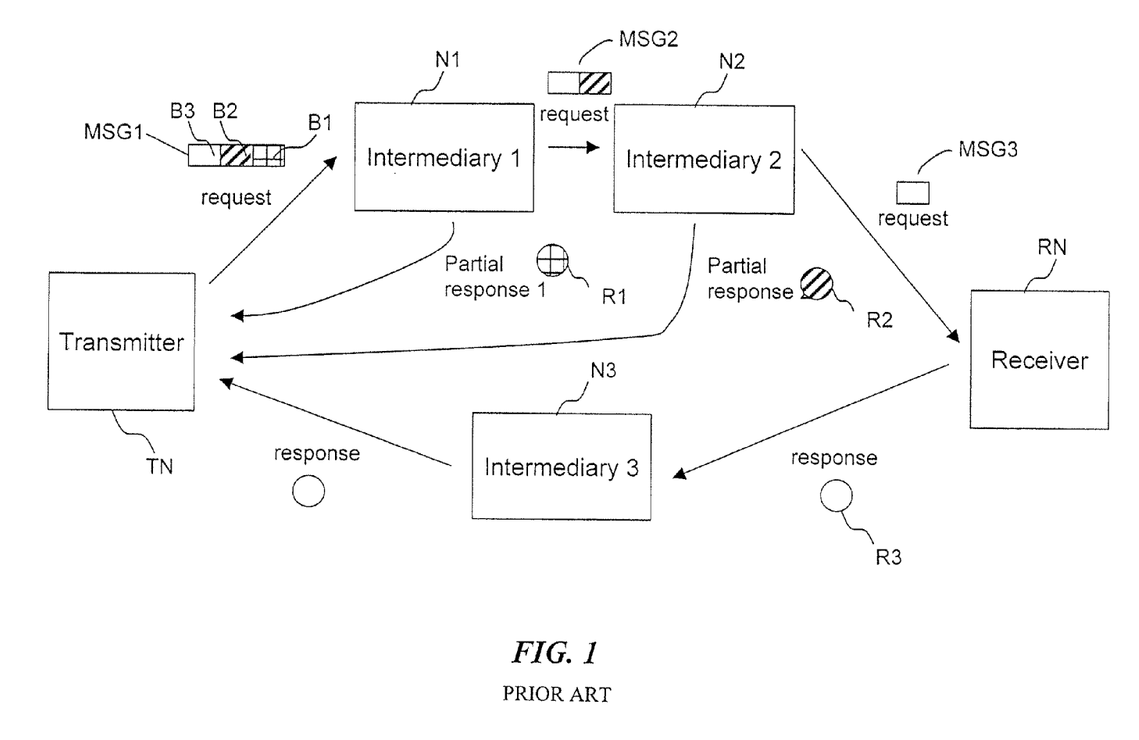
FIG. 1 shows an example of the transmission of a message according to a conventional system, between a transmitter node and a receiver node in a communication network.

By way of example, FIG. 1 shows an example of message transmission according to a conventional system between a transmitter node and a receiver node in a communication network. In this example, a transmitter node TN sends a request message MSG1 destined for a receiver node RN. In the path followed across the network, the request message passes through two intermediary nodes N1 and N2 before finally arriving at the receiver node RN. In this example, the initial request message MSG1 contains three distinct information blocks B1, B2, and B3 destined respectively for the first intermediary node N1, the second intermediary node N2 and for the receiver node RN.

According to the conventional system set out here, the intermediary node N1 receives the initial message MSG1 as an input message, processes the information block B1 which is destined for it, and as a consequence sends a response message, known as a "partial response", R1 to the transmitter node TN. Moreover, the intermediary node N1 delivers an output message MSG2 destined for the following node in the path, that is to say N2. The message MSG2, now only containing the blocks B2 and B3, is the input message received by the intermediary node N2. The latter, like the previous intermediary node (N1), processes the block (B2) destined for it and sends a partial response R2 to the transmitter node (TN). The intermediary node N2 finally delivers an output message MSG3 to the receiver node RN. Message MSG3 only contains the block B3 destined for the receiver (RN). As for the receiver node (RN), this processes the block reserved for it and generates a third message of partial response R3. The message R3 is finally routed via a third intermediary node N3 (which in this example does not perform any processing) to the transmitter node TN.

Thus, in this example, for an initial request message sent by a transmitter node (TN) via two intermediary nodes (N1 and N2) and destined for a receiver node (RN), two partial responses (R1 and R2) and one final response (R3) have been received by the transmitter node (TN). In general terms, according to the conventional method illustrated and set out here, if n intermediary nodes (n designating some integer) are present on the path between the receiver node considered, n+1 response messages are sent to the transmitter node.

It can clearly be understood from the foregoing that such a system for processing messages in a network promotes an increase in the number of messages on the network, and thus overload. Moreover, since the reception of the responses (partial and final) is asynchronous, the transmitter node must be capable of recognizing all these responses as being linked to a same initial request message, and must furthermore wait to receive them all before processing them. A secondary consequence of this is to increase the workload of the transmitter node and thus to penalize the processing times, so requiring more powerful and therefore more costly hardware and/or software resources to remedy this problem.

In the patent document No. U.S. Pat. No. 5,944,843 (Hewlett-Packard), a method is described making it possible to utilize the unused bits in a data packet for transmitting additional information, by "piggy-backing" the "secondary" code word corresponding to that additional information on a "primary" code word already contained in the data packet. According to this document, the secondary code word can be "piggy-backed" on a data packet containing a primary code word, when the primary code word and, possibly, secondary code words already stored in the data packet, leave enough space in the data packet to store an additional secondary code word there. Moreover, it is necessary for the path followed by the data packet, when the packet is routed towards the network node to which the primary code word is addressed, to pass through (or to end with) the network node to which is addressed the secondary code word, or else to pass through (or to end with) the network node capable of relaying the secondary code word towards the network node to which is addressed the secondary code word.

Although the system which is the subject of this document makes it possible in a certain way to reduce the number of messages circulating on the network and thus to reduce the load on the network, the document does not deal with the specific case of communication protocols in which partial response messages are able to be generated by the intermediary nodes (intermediaries), as set out above with reference to FIG. 1, and, consequently, the system disclosed in this document does not provide a satisfactory answer to the drawbacks mentioned above.

The object of the present invention is to solve the above-mentioned drawbacks.

To this end, the invention concerns, according to a first aspect, a method of processing a message in a communication network, the message traveling on the network along a path which may be closed and which comprises a plurality of nodes, and being constituted by a plurality of distinct information blocks of which certain may be destined for different nodes. This method is implemented in a node of the path and is characterized in that it comprises the following steps:
  receiving the message;
  identifying in the message the information blocks destined for the said node;
  processing the identified information blocks, with the creation as a consequence of at least one result data item;
  modifying the message by inclusion in it of the said at least one result data item;
  transmitting the message to the following node along the path.

In this manner, by using the original message to transport the resulting data, that is to say the "partial" responses, generated by the nodes along the path, the number of independent response messages traveling on the network in response to a single initial request message is minimized, and thereby also the network load. Furthermore, grouping together these partial responses in a single message facilitates their reception and their processing by the transmitter node at the origin of the original message.

According to a particular aspect of the invention, the step of identifying the information blocks comprises the determination of which information blocks comprise the electronic address of the node.

This manner of identifying the addressee of the information blocks contained in the original message is particularly adapted to messages of the kind using a data description language such as the language XML. This manner of identification is thus particularly adapted to networks of the Internet kind.

According to another particular aspect of the invention, the step of processing the information blocks identified comprises a marking sub-step of at least one result data item as such.

In this way, the transmitter node of the original message can easily interpret the resulting data contained in the response message (the message which it finally receives after the sending of the initial message) as being the responses to the requests processed by the nodes on the path followed by the message in the network.

According to one feature of the invention, the marking sub-step comprises the insertion into each resulting data item of an identification information item adapted to identify the information block of which the processing has given rise to the resulting data item considered.

This identification information item can be, for example, the electronic address of the node from which the processed information block originates. In this manner, it is not necessary to keep the information blocks which have been the subject of local processing by the nodes of the path in the message which travels along the path in the network. As a consequence, this makes it possible to reduce the size of the message.

According to a particular embodiment of the invention, the message transmission step is preceded by a step of determining which is the following node along the path.

This provision is particularly adapted to modes of message transmission in which, in a given node, the following addressee of a message received is determined according to, for example, a configuration file of the node considered, or where the nodes of a path along which a message travels in a network are determined step by step at each node of the said path.

According to a second aspect, the invention concerns a device for processing a message incorporated in a node of a communication network, the said message traveling on the network along a path which may be closed and which comprises a plurality of nodes, the message being constituted by a plurality of distinct information blocks of which certain may be destined for different nodes. According to the invention, the device comprises means adapted to implement a method of processing a message as briefly set out above.

More precisely, the device, which is incorporated in a network node, comprises:
 means for receiving a message
 means for identifying, in the message, the information blocks destined for the said node;
 means for processing the identified information blocks, making it possible as a consequence to obtain at least one result data item;
 means for modifying the message by inclusion in it of the said at least one result data item;
 means for transmitting the resulting message to the following node along the path.

The present invention also relates to a node in a communication network comprising such a device. The invention furthermore relates to a communication network comprising such nodes.

The present invention also relates to a computer program on an information carrier. This computer program is remarkable in that it comprises program instructions adapted for the implementation of a method of processing a message as briefly set out above, when the computer program is loaded and run on a computer.

The invention also relates to an information carrier containing such a computer program. Such an information carrier may comprise a memory means, such as a ROM, for example a CD-ROM or a semi-conductor ROM, or a magnetic recording means, for example a floppy disk or a hard disk. Furthermore, the carrier may be a transmissible carrier such as an electrical or optical signal, which may be routed via an electric or optic cable, or else by radio or other means.

The advantages of this device, computer program, and of this data carrier, are identical to those of the method according to the invention, as briefly set out above.

Other features and advantages of the invention will appear in the following description of a preferred embodiment of the invention described with the aid of the accompanying drawings in which.

A description will now be given with reference to FIG. 2 of the functional modules of a message processing device according to the invention, incorporated in a node of a communication network. This node may be an intermediary node or a receiver node as defined in the description above (with reference to FIG. 1).

A device for message processing according to the invention is constituted by hardware and software elements, the software elements including the different functional elements making up a computer program for message processing in accordance with the invention.

According to a preferred embodiment, the device is constituted by a computer system, such as a micro-computer, described later with reference to FIG. 5, in which a computer program for message processing according to the invention has already been installed, the running of which makes it possible to control the operation of the said computer system.

Figure 2:
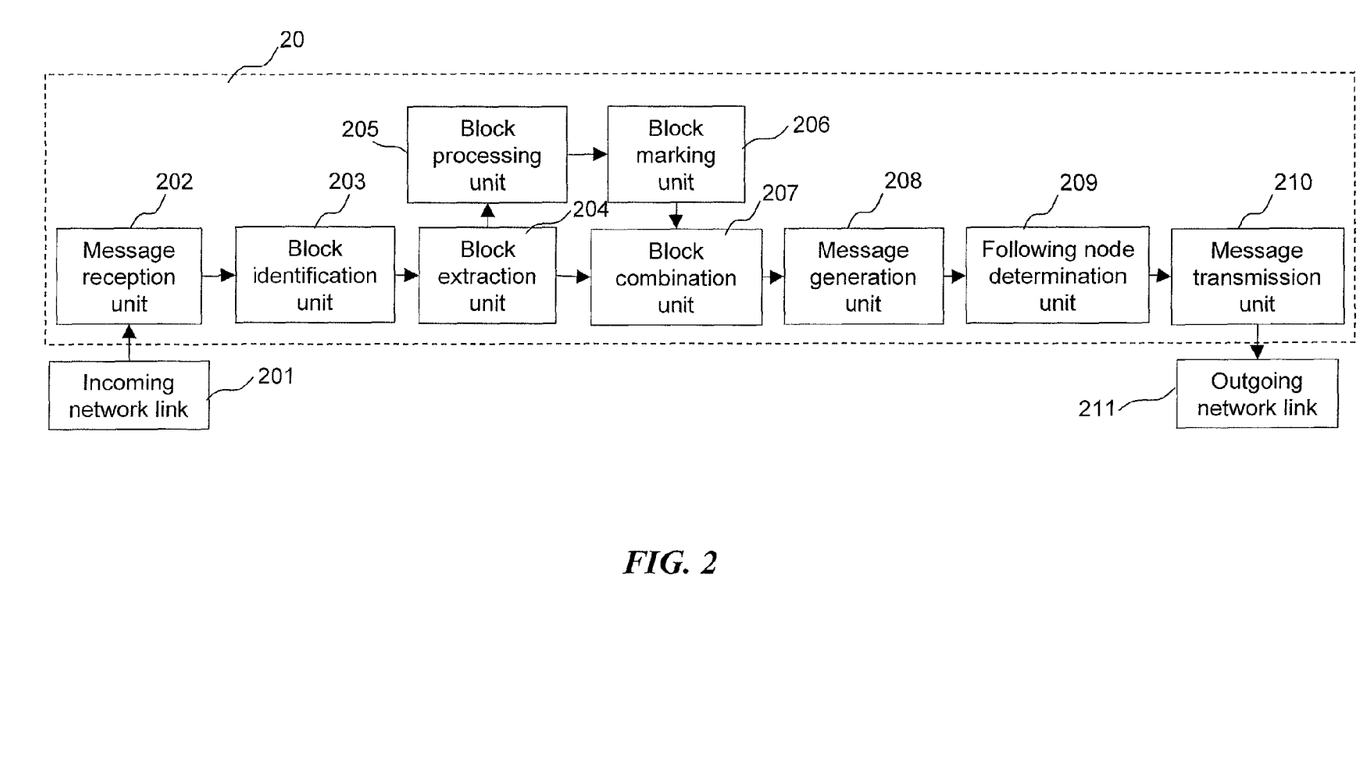
FIG. 2 is a block diagram representing the functional modules of a message processing device according to the invention incorporated in a node in a communication network.

As shown in FIG. 2, the device 20 for message processing according to the invention comprises a message reception unit 202.

It also comprises means for identifying information blocks. According to the embodiment chosen and represented, these identification means comprise both an identification unit 203 for identifying information blocks in a message; and an extraction unit 204 for extracting information blocks identified in a message.

The device 20 comprises means for processing the information blocks identified in a message. According to the embodiment chosen and represented, these processing means comprise the following units:

an actual processing unit 205 for processing identified information blocks.

a unit 206 for marking processed information blocks.

Device 20 further comprises means for modification of a message received. According to the embodiment chosen and represented, these modification means comprise a unit 207 for combining information blocks, and a message generation unit 208.

Device 20 also comprises transmission means for transmitting a message to a determined node in the network. According to the embodiment chosen and represented, these transmission means comprise a unit 209 for determining a following block, and an actual message transmission unit 210.

Device 20 is connected to the communication network by the intermediation of an incoming network link (201) and an outgoing network link 211 connected respectively to the message reception unit 202 and to the message transmission unit 210.

The operation of each of the units of the device 20 according to the invention will be described hereinafter, in relation to the description of a method of processing messages in accordance with the invention. This method is implemented in a node of a communication network by a device such as the device 20 described above.

The method of processing according to the invention applies to any computer communication network. According to a preferred embodiment, the network considered is the Internet. In this embodiment, the messages are expressed in the data description language known by the acronym XML. These messages are then routed in the network according to the known protocol HTTP, which is constructed above the known transport protocol TCP/IP (Transmission Control Protocol—Internet Protocol).

The invention concerns the processing of a message transmitted by an transmitter node and destined for one or more nodes in the network, following a path (constituted by successive nodes) across the network. The path may be predetermined in the transmitter node prior to the transmission of the message. However, the path may also be determined during the course of the transmission of the message, in a step by step manner by the successive nodes through which the message passes. The nodes passed through may be "intermediary" nodes as defined above.

Moreover, it may be that one of the nodes of the path, designated "receiver node", is the last node of the path, to which an information block contained in the message is destined.

Furthermore, the path considered in the network, along which the message passes, may be determined by the contents of the message itself, for example by the electronic address (e.g. Internet address) of the nodes to which the information blocks contained in the message are addressed.

Thus, the path considered can be a closed path, that is to say forming a loop, beginning and ending with the node transmitting the message.

An example of a message processed according to the invention, in course of passing through such a network, will be described further on in the description.

A message processed according to the invention is generally constituted by a plurality of distinct information blocks of which certain may be destined for different nodes in the path followed by the message in the network.

The method of processing a message according to the invention is implemented in any node of the network. In other words, a network in which such a method is utilized must comprise nodes, for example computers, each equipped with a processing device (20) as described above (FIG. 2).

According to the invention, the method of processing comprises the following main steps:

reception of a message in the node considered;

identification, in the message, of the information blocks destined for the node considered;

processing the identified information blocks, with the creation as a consequence of at least one result data item;

modification of the message by inclusion in it of the resulting item or items of data;

transmission of the message to the following node along the path followed by the message.

These steps will now be detailed in connection with FIG. 3 which illustrates the method of processing a message according to a preferred embodiment.

Figure 3:
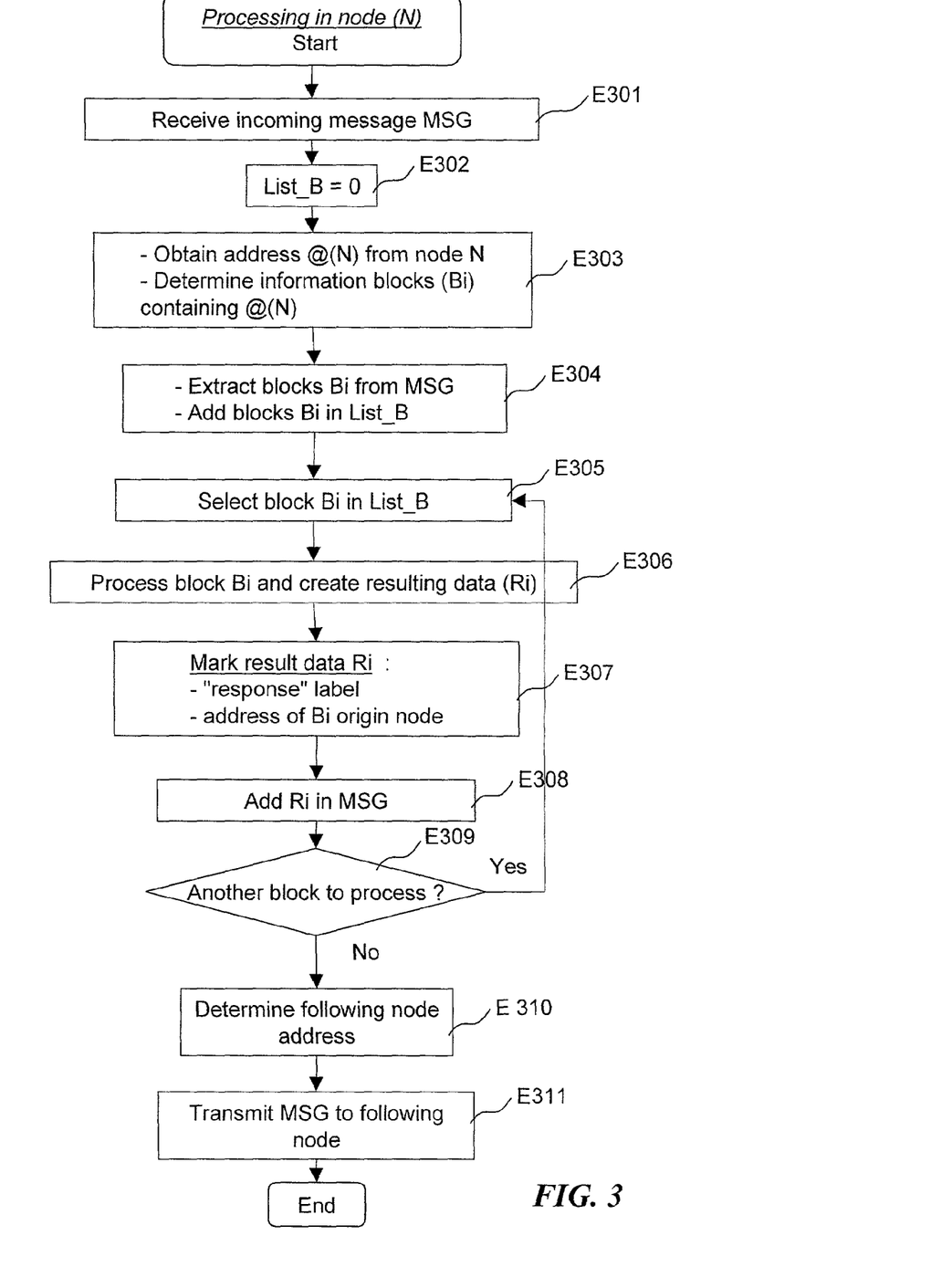
FIG. 3 is a flowchart showing a method of processing a message according to the invention, implemented in a node in a communication network.

As shown in FIG. 3, the processing of a message MSG, arriving via an incoming network link (201), in a node N, starts by the reception (S301) of the message in the unit 202 of the device 20 incorporated in the node.

The message is next supplied as an input to the block identification unit (203) in which identification is performed in the message of the information blocks destined for the node under consideration N. With this aim, a variable, List_B, is first initialized to zero (step S302). In this variable, of which the value is stored in a memory location (for example a register in RAM memory), the information blocks which will be identified and extracted from the message (MSG) will be memorized.

In the preferred embodiment described here, a message is constituted by XML code and a given information block of the message is constituted by a portion of XML code that is isolated by predefined separators (attributes).

Next, at step S303, according to a preferred embodiment, the local electronic address of a node (N) under consideration is first of all obtained. This may for example be its Internet address, which is denoted @(N). Next, determination of the information blocks containing this address is performed. The blocks thus determined are supplied as input to the block extraction unit (204), in which the extraction of the blocks identified (denoted Bi) of the message MSG is performed (step S304).

Still in unit 204, the extracted blocks are next added (step S304) (i.e. concatenated) in the variable List_B, and are then delivered as input to the block processing unit 205. As regards the message MSG, from which the blocks Bi have been extracted, this is directly transferred to the block combination unit 207.

Block identification unit 203 thus makes it possible to separate the information blocks destined for the node under consideration (N), from those destined for other nodes in the path, for example intermediary nodes or a receiver node if there is one, or else from those containing resulting data generated by previous nodes of the path followed by the message (MSG).

During the following steps S305 to S309, local processing (in the block N) is performed of the information blocks destined for the node N. This processing is performed, for each block, by the processing unit 205 and by the block marking unit 206 successively. A test step (S309) makes it possible to verify whether all the blocks (Bi) extracted from the message have been tested.

By way of example, in a multimedia network such as the Internet, the processing of a block may consist in the rotation of an image of which the storage address in the network is specified in the block under consideration, or the verification of a signature, or else the validation and execution of a payment.

Thus an information block (Bi) is first of all selected (S305) in the list List_B, then this block is processed (S306) according to the XML instructions which it contains. The processing terminates with the generation of a result data item, denoted Ri. In practice this result data item is an XML fragment indicating either a result, when the processing implies obtaining a result, or simply the indication that the processing has been accomplished or not (for example an error message).

Each result data item (Ri) is next supplied to the marking unit (206) in order to be "marked" (step S307). In the preferred embodiment, this marking consists of inserting into the XML code of the result data item a label (affribute") (e.g. type="response") indicating that the corresponding code is a response to an XML request message, as well as an item of identification information adapted to identify the information block whose processing has given rise to the result data item under consideration.

In practice, this identification information is constituted by the electronic address (i.e. the Internet address) of the node from which the information block originates.

The resulting data Ri thus "marked" are then delivered, one after the other, to the block combination unit 207 in which they are added to the message MSG (step S308).

Thus, when the processing of all the blocks (Bi) extracted from the message (MSG) has terminated (test S309 negative), block combination unit 207 can supply a modified message MSG in which are included all resulting data generated by the block processing means (units 205 and 206). The modified message MSG is then transferred to the message generation unit 208, where it is to undergo a variety of verifications and/or formatting. In a variant form, it could be arranged for this message generation unit to create a new empty message in which it incorporates the body of the message MSG thus modified.

In the following step, S310, determination of the following node in the network is performed for the message thus obtained at the output of the message generation unit 208. This determination operation is performed by the unit 209 termed the "following node determination unit".

The following node to which the message is to be transmitted could be encoded directly in the initial message, when, for example, the path followed is calculated on sending the message by the transmitter node. This "following node" could, in certain implementations, be determined by the consultation of a configuration table or configuration file in the node (N) under consideration.

Finally, at step S311, the modified message MSG is transmitted by the message transmission unit 210, to the following node of the path, via the outgoing network link (211).

It is to be noted here that, by way of variant form, it could be provided for the resulting data generated during the course of the routing of the message in the network to be incorporated (e.g. concatenated) in the message with the corresponding information blocks. The final message obtained will in that case be greater than that of the initial message. However, the message generation operation would thereby be simplified.

Figure 4:
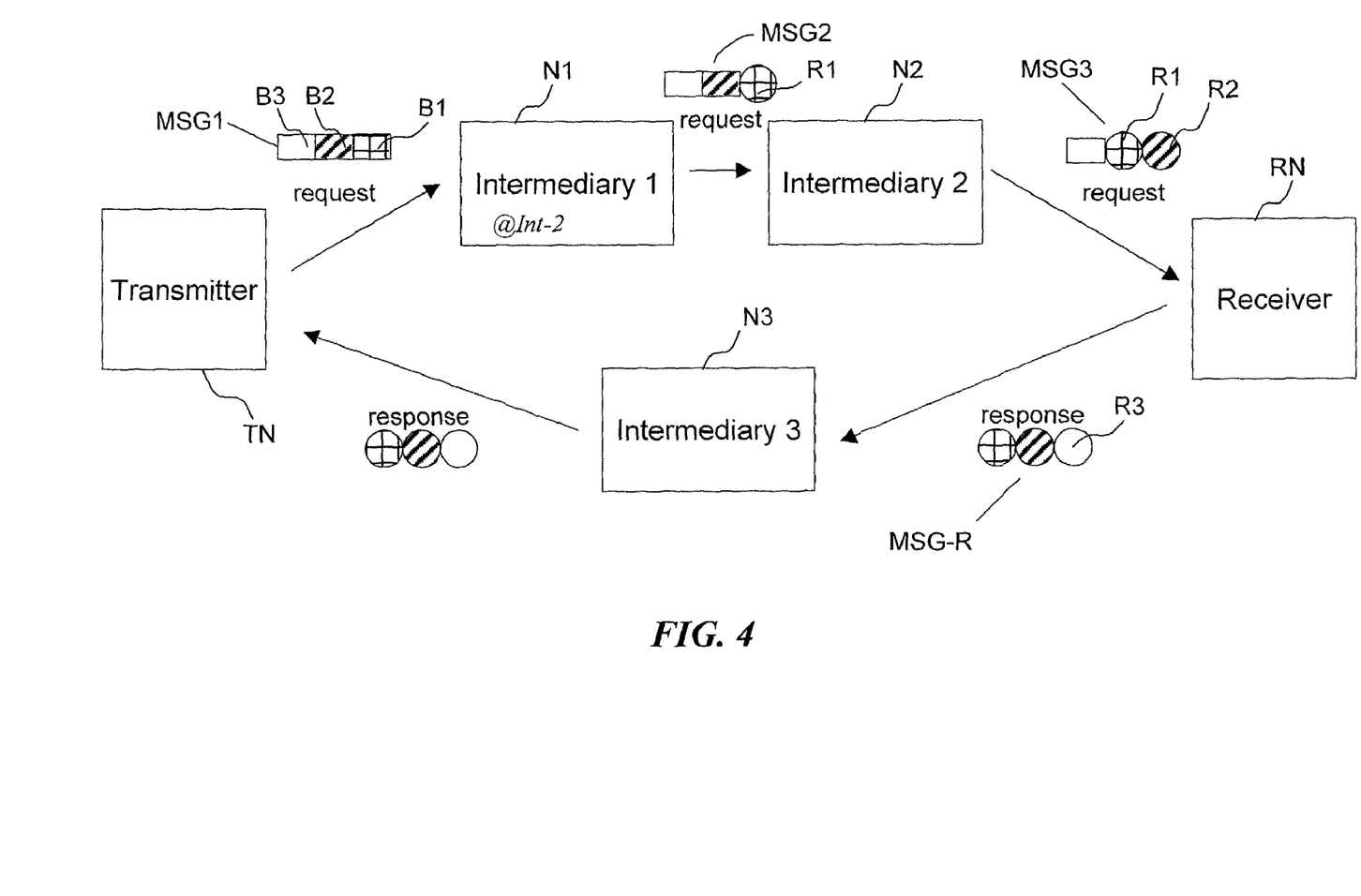
FIG. 4 shows the transmission of a message according to a method in accordance with the invention, between a transmitter node and a receiver node in a communication network.

FIG. 4 shows the transmission of a message according to a method in accordance with the invention applied to the example of a network described earlier with reference to FIG. 1. In this example, as in that of FIG. 1, a transmitter node TN sends out a request message MSG1 of which the destination is a receiver node RN. In the path followed across the network, the request message passes via two intermediary nodes (intermediaries) N1 and N2 before finally arriving at the receiver RN. In this example, the initial request message MSG1 contains three distinct information blocks B1, B2, and B3 respectively destined for the first intermediary node N1, the second intermediary node N2 and the receiver node RN.

By contrast with the process set out above with reference to FIG. 1, and according to the invention, the intermediary node receives the initial message MSG1 as an incoming message, processes the information block B1 destined for it, as a consequence generates a result data item R1, and delivers as an output a message MSG2 which corresponds to the message MSG1 modified by the replacement of the information block B1 by the result data item R1. By way of example, as shown by the indication "@Int-2" in the drawing, the node N2 for which the message MSG2 is destined had been determined in the node N1 by locally obtaining (e.g. in a configuration file) the electronic address denoted"@Int-2" of the node N2.

Likewise, the node N2 receives as an incoming message the modified message MSG2, and processes the block B2 which is destined for it. As a consequence, it generates a result data item R2, and delivers a message MSG3 as an output which corresponds to the message MSG2 modified by the replacement of the information block B2 by the result data item R2. The message MSG3 is then transmitted to the receiver node RN. The latter processes the information block, B3, which is destined for it, in the same manner as the other nodes (N1 and N2), and generates as a consequence a result data item R3. The result data item R3 is incorporated in the message MSG3 thus modified, by replacing the information block B3.

Finally, the receiver node RN delivers a response message MSG-R composed of three result data items (or partial responses) R1, R2 and R3. The message MSG-R is finally transmitted to the transmitter node TN via an intermediary node N3 which has performed no local processing, as no information block in the message MSG-R is destined for it.

Moreover, in this example, the fact which differentiates the receiver node RN from the other nodes of the path (the loop N1, N2, RN, and N3) is that it is the last node in the path, to which an information block contained in the initial message (MSG1) is destined.

Note also that, in a general manner, the path followed by the message in the network can form a loop composed of nodes, this loop beginning and ending with the transmitter node, each of the nodes composing the loop able to be the addressee of a portion of the message.

In case of absence of answer MSG-R to the transmission node TN in response to the request message MSG1, the transmission node TN generates, after a certain timeout period, a message similar to the request message MSG1 previously sent. For that, the request message MSG1 is stored in the memory of the transmission node TN for later retransmission.

Such retransmission can be done repetitively a predetermined number of times, for example 5 times, with a fixed or variable delay between two consecutive retransmissions.

If the request message MSG1 needs to be processed within a certain delay, the request message MSG1 is not stored in memory, and, after a predetermined timeout, an error message is generated in the transmission node TN in order to notify the absence of answer MSG-R. In one embodiment, the request message MSG1 is modified and generated again after a certain delay.

The absence of answer MSG-R may be due to different causes, for example, the network traffic load, or the processing load of a node which processes or transfers the request message MSG1, or the messages MSG2 and MSG3.

Thus, by contrast with the example of FIG. 1, where two partial responses (R1 and R2) and one final response (R3) have been received by the transmitter node (TN), in the example of FIG. 4 in accordance with the invention, a single response message (MSG-R) is received by the transmitter node TN. Furthermore, according to the invention, the three partial responses R1, R2 and R3 are simultaneously received by the transmitter node, and not asynchronously as is the case in the example of FIG. 1.

Below an example is given of a message processed according to the invention in a multimedia network of the Internet kind, applied to the example of FIG. 4. It may for example be a message MSG2 delivered as an Input to the node N2. In this example the message is expressed in XML language.

```
< ?xml version="1.0" ?>
<message>
    <rotate type="request" target="n2.crf.canon.fr">
        <image>jjm.jpeg</image>
        <angle>90</angle>
    </rotate>
    <resize type="request" target="rn.crf.canon.fr">
        <image>jjm.gif</image>
        <width>50</width>
        <height>100</height>
    </resize>
    <dimension type="response" target="tn.crf.canon.fr">
        <width>155</width>
        <height>244</height>
    </dimension>
</message>
```

The above XML message can be broken down into three distinct information blocks. The purpose of the first block, of request type (type="request"), is to rotate an image stored at the address: jjm.jpeg through 90°.

This information block is destined for the node N2, as encoded by the instruction: target="n2.crf.canon.fr".

A second information block is also a request, the purpose of which is to enlarge (resize) an image stored at the address: jjm.gif.

This second information block is destined for the receiver node RN, as encoded by the instruction: target="rn.crf.canon.fr".

Lastly, the third block is a response, i.e. a result data item, generated by one of the nodes of the path, for example the node N1. The property "response" (or result data item) is indicated by the instruction: type="response".

Furthermore, this result data item has been obtained by the processing of an information block of which the transmitter is the node TN as encoded by the instruction: target="tn.crf.canon.fr". Finally, the contents of this result data item can for example be the current size (dimensions) of an image. Note that the information block (request) corresponding to this result data item, has disappeared from the message.

Figure 5:
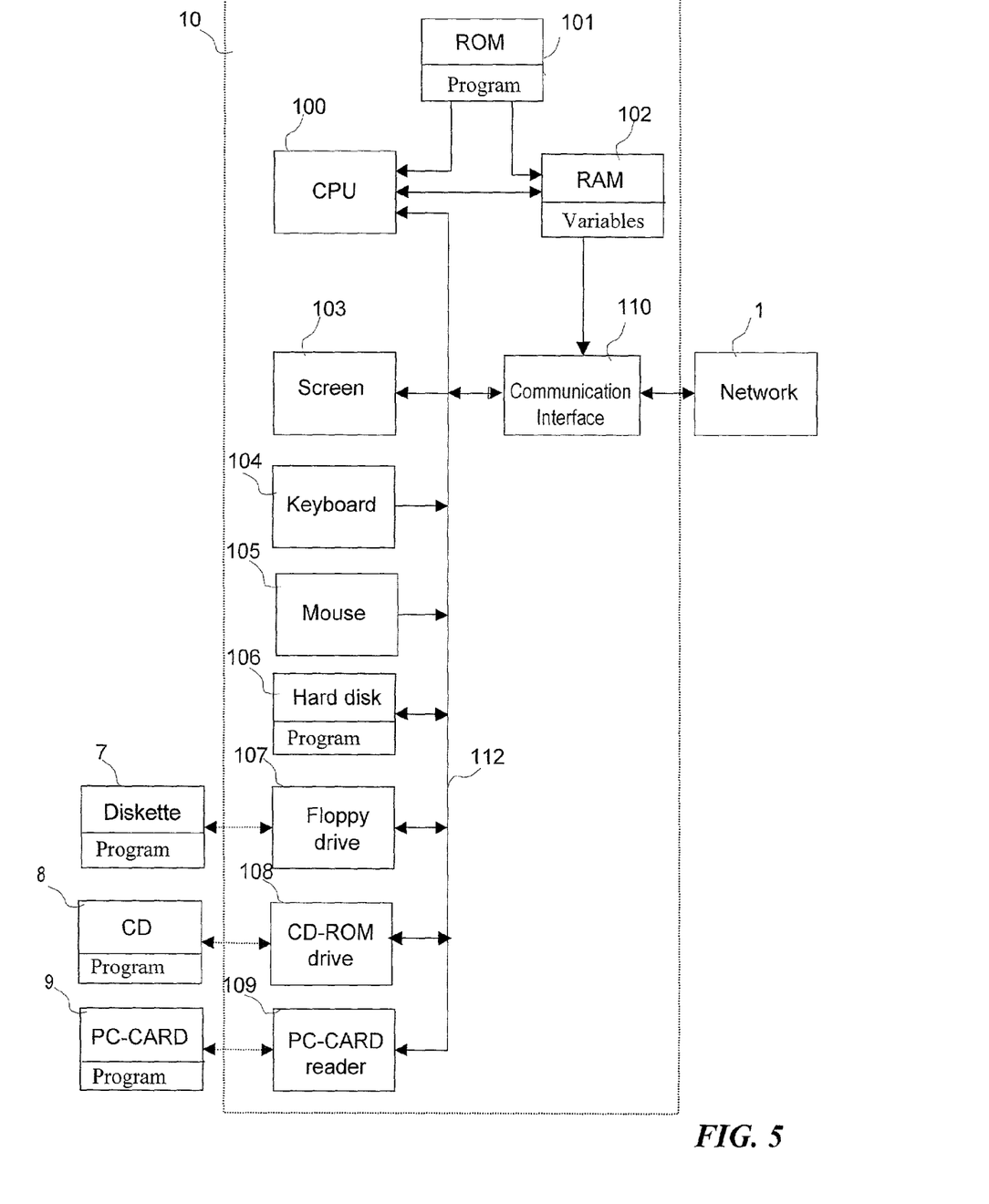
FIG. 5 shows a computer system adapted to implement a method of processing a message according to the invention.

With reference to FIG. 5 a computer or computer system (10) adapted to implement a message processing method according to the invention will now be described. In other words, this computer system incorporates a message processing device such as already described with reference to FIG. 2. This computer system is for example a micro-computer or work station. This computer system constitutes (or else is incorporated in) a node of a communication network according to the invention.

In this embodiment, the method of processing a message according to the invention is implemented by the execution of a computer program according to the invention loaded in this computer system.

The computer system 10 comprises in conventional manner a communication bus 112 to which are connected:
A central processing unit 100 (microprocessor).
A ROM memory 101, in which the executable code of the computer program of the invention can be memorized.
A RAM memory 102, comprising registers adapted to record the variables modified during the course of the execution of the program.
A screen 103 capable of serving as a user interface, with the aid of a keyboard 104 or any other means, for example a mouse 105. This screen could for example enable a user to view the messages received and processed in the system.
A hard disk 106, on which, as an alternative to the memory ROM, the executable code of the program according to the invention can be stored. The source code of the program could also be stored on the hard disk and compiled on execution of the program.
A floppy drive 107 adapted to receive a diskette 7. The program of the invention stored on a diskette could thus alternatively be loaded onto the computer 10 via the floppy drive 107.
A CD driver 108 adapted to read a CD (compact disk) 8. The program of the invention (source or executable) stored on a CD can thus alternatively be loaded onto the computer 10 via the CD drive 108.
A PC-CARD reader 109 could in the same way enable the program of the invention stored on a PC-CARD 9 to be loaded into the computer.
a interface 110 for communication with a communication network 1 making it possible to receive messages from other systems or nodes connected to the network, as well as enabling the message processing program of the invention to be downloaded from another computer system on the network.

It should be noted, on the one hand, that the communication bus 112 allows communication to be made between the different elements included in the computer system 10 or linked to it, and on the other hand, that the representation of the bus is not limiting, and, in particular, that the central processing unit (100) is capable of communicating instructions to any element of the computer 10 either directly or by the intermediation of another element of the computer.

In brief, the invention described here relates to a method and a device for processing a message in a communication network. According to the preferred embodiment, the steps of the method are determined by the instructions of a message processing program according to the invention, and the method is implemented when the program is loaded into a computer of which the operation is then controlled by the execution of the program.

As a result, the invention also applies to a computer program, particularly a computer program on or in an information carrier, adapted to implement the invention. The program can use any program language, and be in the form of source code, object code, or code that is intermediate between source and object code as in a partially compiled form, or in any other form desired to implement a method according to the invention. The information carrier can be any entity or device capable of storing the program.

For example, the carrier may comprise a storage means, such as a ROM, for example a CD-ROM or a semi-conductor ROM, or a magnetic recording means, for example a diskette (floppy disk) or a hard disk. Furthermore, the carrier can be a transmissible carrier such as an electrical or optical signal, which can be routed via an electric or optic cable, or else by radio or other means.

Alternatively, the carrier can be an integrated circuit in which the program is incorporated, the circuit being adapted to run the method in question, or to be used in the performance of the method.

Naturally, the present invention is not limited to the embodiments described here by way of example, but on the contrary covers modifications within the capacity of the person skilled in the art, without departing from the scope of the invention.

The invention claimed is:

1. A method of processing an outgoing message in a communication network, the message traveling on the network from a transmitter node to a receiver node along a path which may be closed and which comprises a plurality of nodes including first and second intermediate nodes, the message being expressed in a data description language and comprising a plurality of distinct information blocks of which at least two distinct information blocks are respectively destined for the first and second intermediate nodes of the path, the method being implemented in at least both of the first and second intermediate nodes of the path and comprising the following steps executed at least in both of the first and second intermediate nodes:
receiving the message;
identifying in the message the information blocks destined for the node;
processing the identified information blocks to produce at least one result data item including a response destined for the transmitter node, wherein the at least one result data item is marked as a result data item by inserting a mark in the result data item, and wherein the transmitter node interprets the at least one result data item;
modifying the message by including in the message the at least one result data item; and
transmitting the modified message to a following node along the path, wherein the receiver node is a last node in the path for which an information block contained in the message is destined, the receiver node then transmitting a response message to the transmitter node.

2. A method as claimed in claim 1, wherein said step of identifying the information blocks includes determining which information blocks comprise an electronic address of the node.

3. A method as claimed in claim 1, wherein said step of identifying the information blocks comprises a prior extraction sub-step of extracting these blocks from the message.

4. A method as claimed in claim 1, wherein said marking sub-step comprises inserting into each resulting data item an identification information item adapted to identify the information block of which the processing has given rise to the resulting data item considered.

5. A method as claimed in claim 4, wherein the identification information item comprises an electronic address of the node from which the information block originates.

6. A method as claimed claim 1, wherein said message transmission step comprises a sub-step of determining the following node along the path.

7. A method as claimed in claim 1, wherein the transmission of a message uses Hypertext Transfer Protocol.

8. A method as claimed in claim 1, wherein the communication network is the Internet.

9. A computer-readable non-transmissible information carrier, the program comprising program instructions and being executable to cause a computer to perform a method of processing a message according to claim 1.

10. A method as claimed in claim 1, wherein the step of modifying the message comprises replacing the information block by the at least one result data item.

11. A method as claimed in claim 1, wherein said step of modifying the message includes adding the at least one result data item to the message.

12. A method as claimed in claim 1, wherein, in said step of processing each of the identified information blocks, the at least one result data item is an indication as to whether said step of processing has been accomplished or not.

13. A method according to claim 1, wherein in the modifying step, the message is modified to include grouped responses destined for the transmitter node from both of at least the first and second nodes, and wherein the transmitting step transmits the response message including at least the grouped responses to the transmitter node.

14. A method according to claim 1, wherein in the transmitting step, the response message includes the result data item of the first node and the result data item of the second node.

15. A method as claimed in claim 1, wherein the data description language is XML.

16. A device for processing a message incorporated in a node of a communication network, the message traveling on the network from a transmitter node along a path which may be closed and which comprises a plurality of nodes, the message being constituted by a plurality of distinct information blocks of which certain may be destined for different nodes, said device comprising:
a receiving unit constructed to receive the message;
an identification unit constructed to identify in the message the information blocks destined for the node;
a processing unit comprising a processor constructed to process the identified information blocks to produce at least one result data item including a response destined for the transmitter node, wherein the at least one result data item is marked as a result data item by inserting a mark in the result data item, and wherein the transmitter node interprets the at least one result data item;
a modifying unit constructed to modify the message by including in the message the at least one result data item; and
a transmitting unit constructed to transmit the modified message to a following node along the path, wherein the receiver node is a last node in the path for which an information block contained in the message is destined, the receiver node then transmitting a response message to the transmitter node.

17. A device for processing an outgoing message in a communication network, the message traveling on the network from a transmitter node to a receiver node along a path which may be closed and which comprises a plurality of nodes including first and second intermediate nodes, the message being expressed in a data description language and comprising a plurality of distinct information blocks of which at least two distinct information blocks are respectively destined for the first and second intermediate nodes of the path, said device being implemented in at least both of the first and second intermediate nodes of the path and comprising in both of the first and second intermediate nodes:
a receiving unit constructed to receive the message;
an identification unit constructed to identify in the message the information blocks destined for the node;
a processing unit comprising a processor constructed to process the identified information blocks to produce at least one result data item including a response destined for the transmitter node, wherein the at least one result data item is marked as a result data item by inserting a mark in the result data item, and wherein the transmitter node interprets the at least one result data item;

a modifying unit constructed to modify the message by including in the message the at least one result data item; and a transmitting unit constructed to transmit the modified message to a following node along the path, wherein the receiver node is a last node in the path for which an information block contained in the message is destined, the receiver node then transmitting a response message to the transmitter node.

18. A device as claimed in claim 17, wherein the transmission of a message uses Hypertext Transfer Protocol.

19. A device as claimed in claim 17, wherein the communication network is the Internet.

20. A node of a communication network comprising a device according to claim 17.

21. A communication network, comprising a plurality of according to claim 20.

22. A device according to claim 17, wherein the modifying unit modifies the message to include grouped responses destined for the transmitter node from both of at least the first and second nodes, and wherein the transmitting unit transmits the response message including at least the grouped responses to the transmitter node.

23. A device according to claim 17, wherein in the transmitting unit, the response message includes the result data item of the first node and the result data item of the second node.

24. A device as claimed in claim 17, wherein the data description language is XML.

* * * * *